US007904432B2

(12) United States Patent
McKay et al.

(10) Patent No.: US 7,904,432 B2
(45) Date of Patent: Mar. 8, 2011

(54) COMPRESSED DATA STRUCTURE FOR EXTRACTED CHANGES TO A DATABASE AND METHOD OF GENERATING THE DATA STRUCTURE

(75) Inventors: Christopher W. T. McKay, Auckland (NZ); Steven Skillcorn, Queenstown (NZ); James G. Douvikas, Danville, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 154 days.

(21) Appl. No.: 10/350,356

(22) Filed: Jan. 24, 2003

(65) Prior Publication Data

US 2004/0148302 A1 Jul. 29, 2004

(51) Int. Cl.
*G06F 7/00* (2006.01)
*G06F 17/00* (2006.01)
(52) U.S. Cl. ........................................................ 707/693
(58) Field of Classification Search .......... 707/200–205, 707/10, 101; 709/224, 247; 705/40
See application file for complete search history.

(56) References Cited

U.S. PATENT DOCUMENTS

| 5,333,313 | A | * | 7/1994 | Heising .............................. 707/1 |
| 5,424,732 | A | * | 6/1995 | Iyer et al. ......................... 341/51 |
| 5,537,551 | A | * | 7/1996 | Denenberg et al. ............ 709/247 |
| 5,546,575 | A | * | 8/1996 | Potter et al. .................... 707/101 |
| 5,574,906 | A | * | 11/1996 | Morris .............................. 707/1 |
| 5,611,076 | A | * | 3/1997 | Durflinger et al. ............. 707/102 |
| 5,691,717 | A | * | 11/1997 | Tamura ............................ 341/50 |
| 5,701,302 | A | * | 12/1997 | Geiger .......................... 370/521 |
| 5,768,528 | A | * | 6/1998 | Stumm .......................... 709/231 |
| 5,794,228 | A | * | 8/1998 | French et al. ..................... 707/2 |
| 5,813,017 | A | * | 9/1998 | Morris .......................... 707/204 |
| 5,893,102 | A | * | 4/1999 | Maimone et al. ............. 707/101 |
| 5,918,224 | A | * | 6/1999 | Bredenberg ......................... 1/1 |
| 5,924,096 | A | * | 7/1999 | Draper et al. ................... 707/10 |
| 5,926,816 | A | * | 7/1999 | Bauer et al. .................... 707/202 |
| 5,991,771 | A | * | 11/1999 | Falls et al. ..................... 707/202 |
| 6,044,381 | A | * | 3/2000 | Boothby et al. .............. 707/201 |

(Continued)

FOREIGN PATENT DOCUMENTS

DE      EP 1128279 A1  *  8/2001

OTHER PUBLICATIONS

Randal C. Burnes & Darrell D.E. Long. In-Place Reconstruction of Delta Compressed Files. IBM Almaden Research Center, San Jose, CA. & Dept. of Computer Science. University of CA. ACM 1998.*

(Continued)

*Primary Examiner* — Cam Y T Truong

(57) ABSTRACT

A method of identifying and storing data changes of a first compressed database compared with a previous compressed database and updating a second compressed database on a user device based on the stored data changes. Data changes are stored in a compressed data structure and data in the first, second, and previous compressed databases is stored in compressed form in one or more uniquely identified data pages. A data page of the first compressed database and the previous compressed database are decompressed and an entry from the first and previous compressed databases is read and compared. If the read entries differ, a type of action performed on the previous entry is identified and an entry in a delta file based on the read entry comparison is stored. The delta file is then compressed. The second compressed database is updated based on the delta file.

15 Claims, 5 Drawing Sheets

U.S. PATENT DOCUMENTS

| | | | |
|---|---|---|---|
| 6,049,390 A * | 4/2000 | Notredame et al. | 358/1.15 |
| 6,055,526 A * | 4/2000 | Ambroziak | 707/2 |
| 6,151,708 A * | 11/2000 | Pedrizetti et al. | 717/173 |
| 6,401,239 B1 * | 6/2002 | Miron | 707/203 |
| 6,523,102 B1 * | 2/2003 | Dye et al. | 711/170 |
| 6,691,158 B1 | 2/2004 | Douvikas | |
| 6,868,402 B1 * | 3/2005 | Hirota et al. | 705/40 |
| 6,889,213 B1 | 5/2005 | Douvikas | |
| 6,892,207 B2 * | 5/2005 | McKay et al. | 707/101 |
| 7,017,109 B1 | 3/2006 | Douvikas | |
| 7,483,875 B2 | 1/2009 | McKay | |
| 2002/0040369 A1 * | 4/2002 | Multer et al. | 707/201 |
| 2003/0005306 A1 * | 1/2003 | Hunt et al. | 713/181 |
| 2003/0172070 A1 * | 9/2003 | Sawadsky et al. | 707/10 |
| 2003/0212712 A1 * | 11/2003 | Gu et al. | 707/200 |
| 2003/0220944 A1 * | 11/2003 | Schottland et al. | 707/203 |
| 2004/0255048 A1 * | 12/2004 | Ran et al. | 709/249 |
| 2005/0033745 A1 * | 2/2005 | Wiener et al. | 707/10 |
| 2005/0138483 A1 * | 6/2005 | Hatonen et al. | 714/45 |
| 2006/0143047 A1 * | 6/2006 | Briegs et al. | 705/2 |

OTHER PUBLICATIONS

Keith H. Randall et al. A Link Database: Fast Access to Graphs of the Web. DCC'02. IEEE 2002.*

Torsten Suel & Nasir Memon. Algorithms for Data Compression and Remote File Synchronization. CIS Dept. Polytechnic University. Brooklyn, NY. Pub. 2000.*

Ng, W.K. et al. Relational database compression using augmented vector quantization. IEEE. Publication Date: Mar. 6-10, 1995.*

Till Westmann et al. The implementation and performance of compressed databases. ACM. vol. 29, Issue 3 (Sep. 2000).*

Gautam Ray et al. Database Compression: A Performance Enhancement Tool. COMAD 1995.*

By P. A. Franaszek, P. Heidelberger, D. E. Poff, and J. T. Robinson. Algorithms and data structures for compressed-memory machines. IBM research. 2001.*

Building Compressed Database Systems. By Z Chen—Aug. 2002. TOB and pp. 117-128—research.microsoft.com.*

A performance evaluation of the mobile agent paradigm -L Ismail, D Hagimont—ACM SIGPLAN Notices, 1999.*

Compression and coding of large cad models -C Bajaj, V Pascucci, G Zhuang—1998—ices.utexas.edu.*

John N. Wilson. A High-Performance Data Structure for Mobile Information Systems. Springer Berlin / Heidelberg. Tuesday, Jan. 1, 2002.*

* cited by examiner

COMPRESSED DATA STRUCTURE FOR EXTRACTED CHANGES TO A DATABASE AND METHOD OF GENERATING THE DATA STRUCTURE

RELATED APPLICATIONS

This application is related to applications entitled, "Single System for Managing Multi-platform Data Retrieval", Ser. No. 10/350,327 filed Jan. 24, 2003 now U.S. Pat. No. 7,483,875; "Compressed Data Structure for a Database", U.S. Ser. No. 10/350,326 filed Jan. 24, 2003 (U.S. Patent Publication No. 2004/0148301), now abandoned; "Portable Executable Software Architecture", U.S. Ser. No. 10/350,090 filed Jan. 24, 2003 (U.S. Patent Publication No. 2004/0148608), now abandoned; and "Method of Updating Data in a Compressed Data Structure", U.S. Ser. No. 10/350,358 filed Jan. 24, 2003 now U.S. Pat. No. 6,892,207, all assigned to the present assignee, all of which are hereby incorporated by reference in their entirety, and all of which are being filed concurrently herewith. This application is also related to applications entitled, "E-service to Manage and Export Contact Information", Ser. No. 09/507,043 filed Feb. 18, 2000 now U.S. Pat. No. 6,691,158; "E-Service to Manage Contact Information and Signature Ecards", Ser. No. 09/507,631 filed Feb. 18, 2000 now U.S. Pat. No. 7,017,109; "E-service to Manage Contact Information and Track Contact Location", Ser. No. 10/679,373, filed Oct. 7, 2003 (U.S. Patent Publication No. 2004/0073869), now abandoned ; and "E-service to Manage Contact Information with Privacy Levels", Ser. No. 09/507,215 filed Feb. 18, 2000 now U.S. Pat. No. 6,889,213, all assigned to the present assignee, and all of which are hereby incorporated by reference in their entirety.

FIELD OF THE INVENTION

The present invention relates to a method and apparatus for a data structure for changes to a database, and more particularly, to such a method and apparatus wherein the changes data structure is compressed.

BACKGROUND

It is known in the art to compress a database containing data to minimize storage requirements for storing the data and reduce transmission times for transmitting the data. In prior approaches, the entire database is compressed and decompressed or extracted for manipulation/query of the data in the database. For example, prior approaches are directed to reducing the search time required for searching over a large database using methods such as binary searches or b-trees both of which require that the data in the database can be read randomly. In order to support random reading from and writing to a compressed database, the entire database must be decompressed.

There is a need in the art for a database having a compressed data structure enabling update of the data without requiring decompression of the entire database. That is, the database remains compressed and occupies a smaller storage space thereby requiring less memory and less transmission time to transfer the database update contents.

For example, handheld or embedded devices are constrained by limited processing power and limited storage or memory in order to increase the device's battery life. A method of updating a compressed database would enable a larger amount of data to be stored on the device and would increase update time. However, prior approaches have always decompressed the entirety of the data prior to update of the data on the device thereby eliminating any advantage gained from database compression.

SUMMARY

It is therefore an object of the present invention to provide a method of storing changes to a database in a compressed data structure.

Another object of the present invention is to provide a mechanism for extracting changes to the data in the database and updating another database without requiring decompression of the entire other database.

The present invention provides a method and computer-readable medium containing instructions for identifying and storing data changes of a first compressed database compared with a previous compressed database and updating a second compressed database based on the stored data changes. Data in the compressed databases is storing in compressed form in one or more uniquely identified data pages. Entries in a decompressed data page of each of the first and previous compressed database are compared. If the entries differ, an action type performed on the entry is identified and an entry stored in a delta file based on the entry comparison. The delta file is compressed and used to update the second compressed database.

A method of identifying and storing data changes of a first compressed database compared with a previous compressed database and updating a second compressed database on a user device based on the stored data changes. The data changes are stored in a compressed data structure and the data in the first, second, and previous compressed databases is stored in compressed form in one or more uniquely identified data pages. The method includes decompressing a data page of the first compressed database and the previous compressed database and reading an entry from the first and previous compressed databases. The read entries are compared and if the read entries differ, a type of action performed on the previous entry is identified. If the read entries differ, an entry in a delta file based on the read entry comparison is stored. The delta file is then compressed.

A computer-readable medium aspect includes (1) a data structure for a first compressed database including one or more uniquely identified data pages, (2) a data structure for a previous compressed database comprising one or more uniquely identified data pages, and (3) instructions for execution by a processor to cause the processor to identify and store changes between the first and previous compressed database and update a second compressed database based on the stored changes. The instructions, when executed by the processor, cause the processor to compare an entry of the first and previous compressed database. If the entries differ, an action type performed on the previous entry is identified and a delta entry is stored in a delta file based on the entry comparison. The delta file is compressed.

Still other objects and advantages of the present invention will become readily apparent to those skilled in the art from the following detailed description, wherein the preferred embodiments of the invention are shown and described, simply by way of illustration of the best mode contemplated of carrying out the invention. As will be realized, the invention is capable of other and different embodiments, and its several details are capable of modifications in various obvious respects, all without departing from the invention.

DESCRIPTION OF THE DRAWINGS

The present invention is illustrated by way of example, and not by limitation, in the figures of the accompanying drawings, wherein elements having the same reference numeral designations represent like elements throughout and wherein.

DETAILED DESCRIPTION

In conjunction with the above-referenced related applications, an embodiment of the present invention provides the file structures and functionality to extract changes to a database and update a compressed data structure in a database for use with a unified service to manage multi-platform data retrieval, such as the unified service referenced above.

Figure 1:
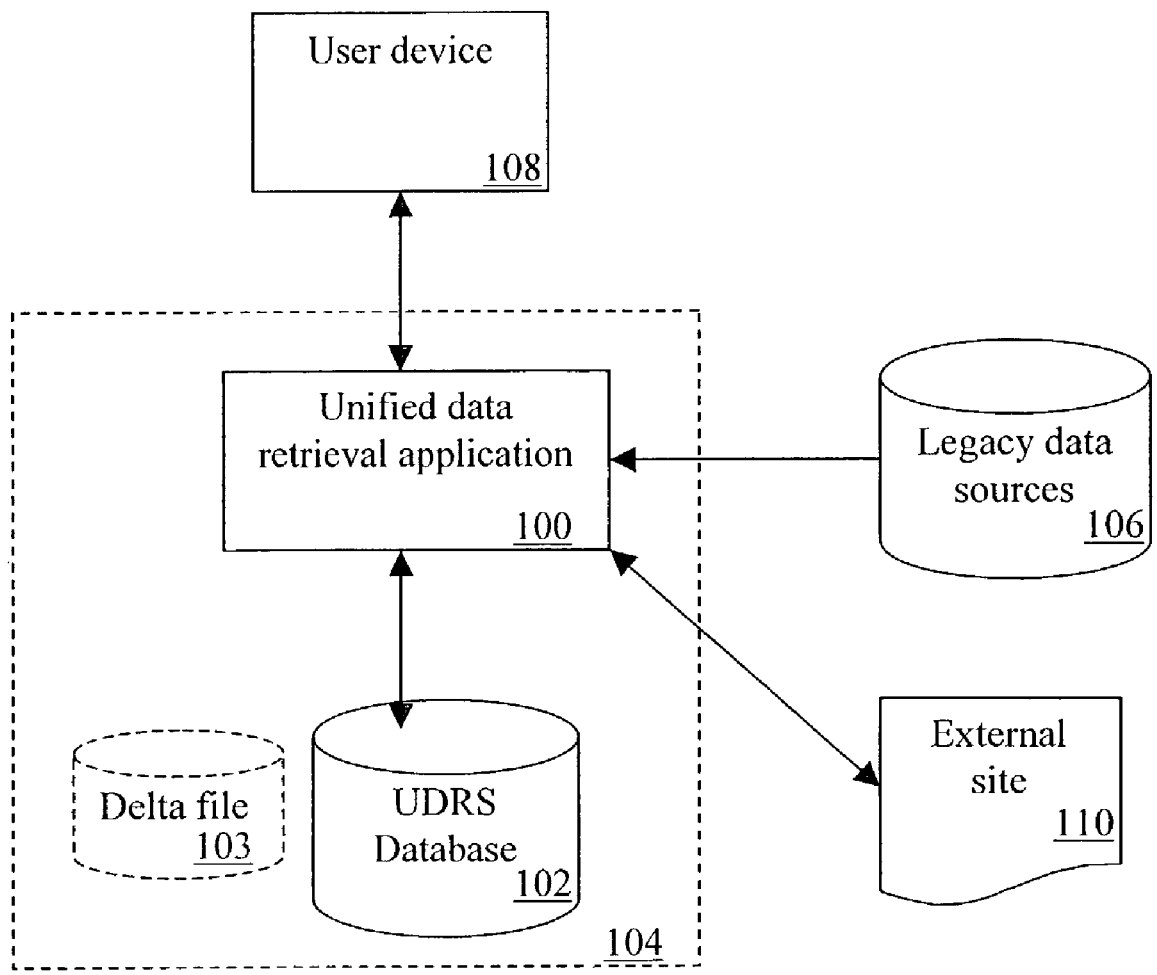
FIG. 1 is a high level block diagram of a logical architecture with which an embodiment of the present invention may be used.

FIG. 1 is a high level diagram of the unified service logical architecture in conjunction with which an embodiment of the present invention may be used. As described in detail in "Unified Service to Manage Multi-Platform Data Retrieval," assigned to the present assignee and hereby incorporated by reference in its entirety, a unified data retrieval application 100, a unified data retrieval service (UDRS) database 102, and a delta file 103 in combination make up a unified data retrieval service 104. Delta file 103 is an optional component of UDRS 104.

Delta file 103 is generated by a processor (not shown) executing UDRS 104 instructions causing the processor to compare the data in older versions of UDRS database 102. The delta file 103 generation process is described in more detail below. If the data in UDRS database 102 has not changed, then there will be no delta file 103. In an alternate embodiment, delta file 103 may be stored in a delta server (not shown) and accessed by UDRS 104.

The UDRS 104 accesses legacy data sources 106, e.g. lightweight directory authentication protocol (LDAP) directory servers, human resources databases, and other databases, to obtain additional information. The additional information may be obtained on a scheduled basis or responsive to a user query received from a user manipulating a user device 108, e.g. a web browser executing on a handheld device, connected to UDRS 104. Additionally, requests may be received and responded to by accessing information stored at an external site 110, for example, www.e-cardfile.com. In this manner, the UDRS 104 obtains information from multiple data sources and provides information in response to user requests.

Figure 5:
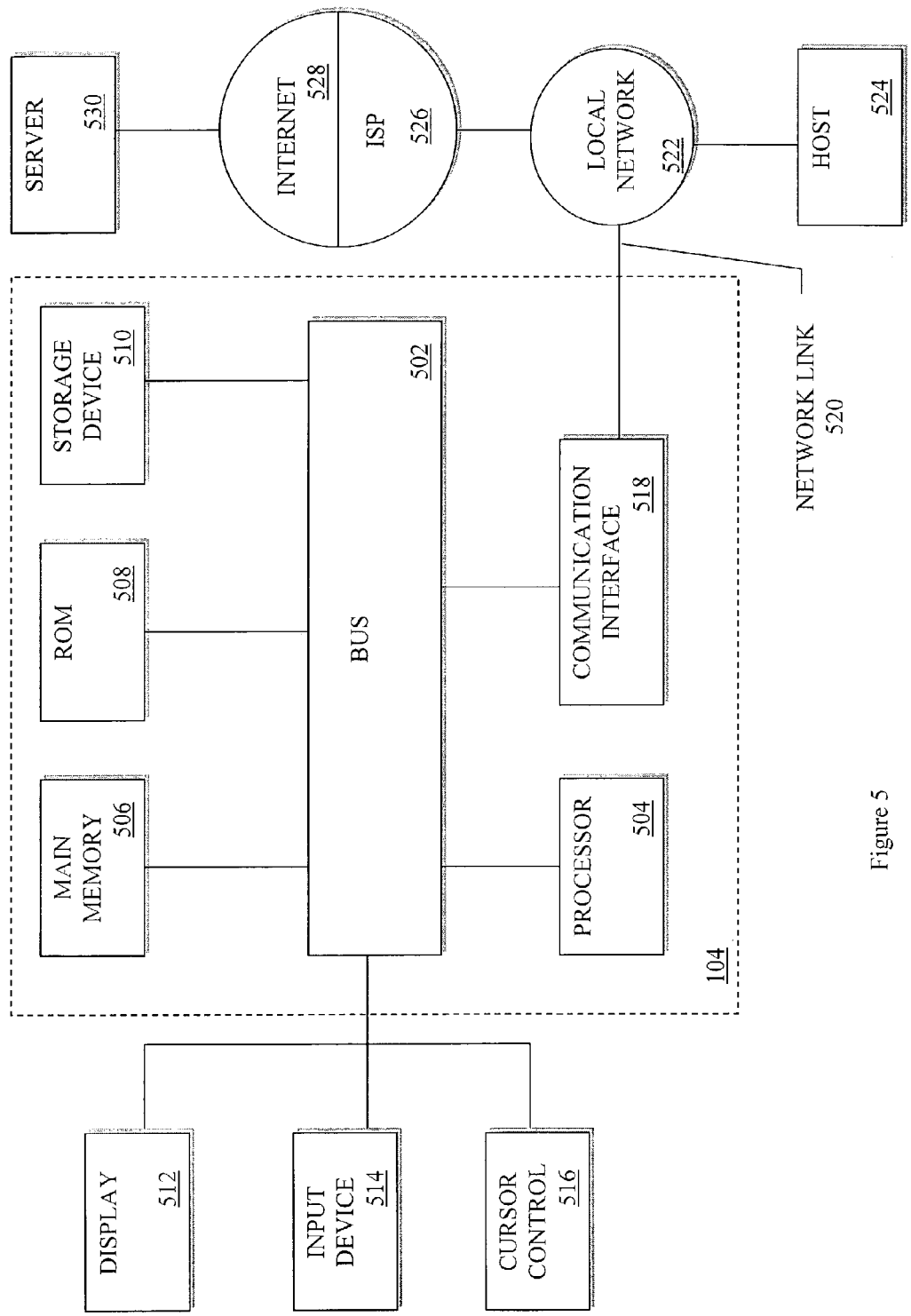
FIG. 5 is a high level block diagram of an exemplary computer upon which an embodiment of the present invention may be used.

FIG. 5 is a high level block diagram depicting an exemplary computer system 104, e.g. a server, upon which an embodiment of the present invention may be implemented. The present invention is usable with currently available personal computers, mini-mainframes and the like.

Computer system 104 includes a bus 502 or other communication mechanism for communicating information, and a processor 504 coupled with the bus 502 for processing information. Computer system 104 also includes a main memory 506, such as a random access memory (RAM) or other dynamic storage device, coupled to the bus 502 for storing a changes data structure, e.g. as embodied by a delta file 103, and instructions to be executed by processor 504. Main memory 506 also may be used for storing temporary variables or other intermediate information during execution of instructions to be executed by processor 504. Computer system 104 further includes a read only memory (ROM) 508 or other static storage device coupled to the bus 502 for storing static information and instructions for the processor 504. A storage device 510, such as a magnetic disk or optical disk, is provided and coupled to the bus 502 for storing a delta file including a changes data structure, and instructions.

Computer system 104 may be coupled via the bus 502 to a display 512, such as a cathode ray tube (CRT) or a flat panel display, for extracting and storing changes to UDRS database 102. An input device 514, including alphanumeric and function keys, is coupled to the bus 502 for communicating information and command selections to the processor 504. Another type of user input device is cursor control 516, such as a mouse, a trackball, or cursor direction keys for communicating direction information and command selections to processor 504 and for controlling cursor movement on the display 512. This input device typically has two degrees of freedom in two axes, a first axis (e.g., x) and a second axis (e.g., y) allowing the device to specify positions in a plane.

The present invention is related to the use of computer system 104, such as the illustrated system of FIG. 5, to extract and store changes to UDRS database 102. According to one embodiment of the invention, the changes to UDRS database 102 are identified and stored in a delta file 103 by computer system 104 in response to processor 504 executing sequences of instructions contained in main memory 506 in response to input received via input device 514, cursor control 516, or communication interface 518. Such instructions may be read into main memory 506 from another computer-readable medium, such as storage device 510.

However, the computer-readable medium is not limited to devices such as storage device 510. For example, the computer-readable medium may include a floppy disk, a flexible disk, hard disk, magnetic tape, or any other magnetic medium, a compact disc read only memory (CD-ROM), any other optical medium, punch cards, paper tape, any other physical medium with patterns of holes, a random access memory (RAM), a programmable ROM (PROM), an electrically programmable (EPROM), a Flash-EPROM, any other memory chip or cartridge, a carrier wave embodied in an electrical, electromagnetic, infrared, or optical signal, or any other medium from which a computer can read. Execution of the sequences of instructions contained in the main memory 506 causes the processor 504 to perform the process steps described below. In alternative embodiments, hard-wired circuitry may be used in place of or in combination with computer software instructions to implement an embodiment of the present invention. Thus, embodiments of the invention are not limited to any specific combination of hardware circuitry and software.

Computer system 104 also includes a communication interface 518 coupled to the bus 502. Communication interface 508 provides two-way data communication as is known. For example, communication interface 518 may be an integrated services digital network (ISDN) card, a digital subscriber line (DSL) card, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals which carry digital data streams representing various types of information. Of particular note, the communications through interface 518 may permit transmission or receipt of a delta file 103 including a changes data structure identifying changes to UDRS database 102. For example, two or more computer systems 104 may be networked together in a conventional manner with each using the communication interface 518.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals which carry digital data streams. The signals through the various networks and the signals on network link 520 and through communication interface 518, which carry the digital data to and from computer system 104, are exemplary forms of carrier waves transporting the information.

Computer system 104 can send messages and receive data, including program code, through the network(s), network link 520 and communication interface 518. In the Internet example, a server 530 might transmit a requested code for an application program through Internet 528, ISP 526, local network 522 and communication interface 518. In accordance with the invention, one such downloaded application provides for extracting and storing changes to UDRS database 102.

The received code may be executed by processor 504 as it is received, and/or stored in storage device 510, or other non-volatile storage for later execution. In this manner, computer system 104 may obtain application code in the form of a carrier wave.

Figure 2:
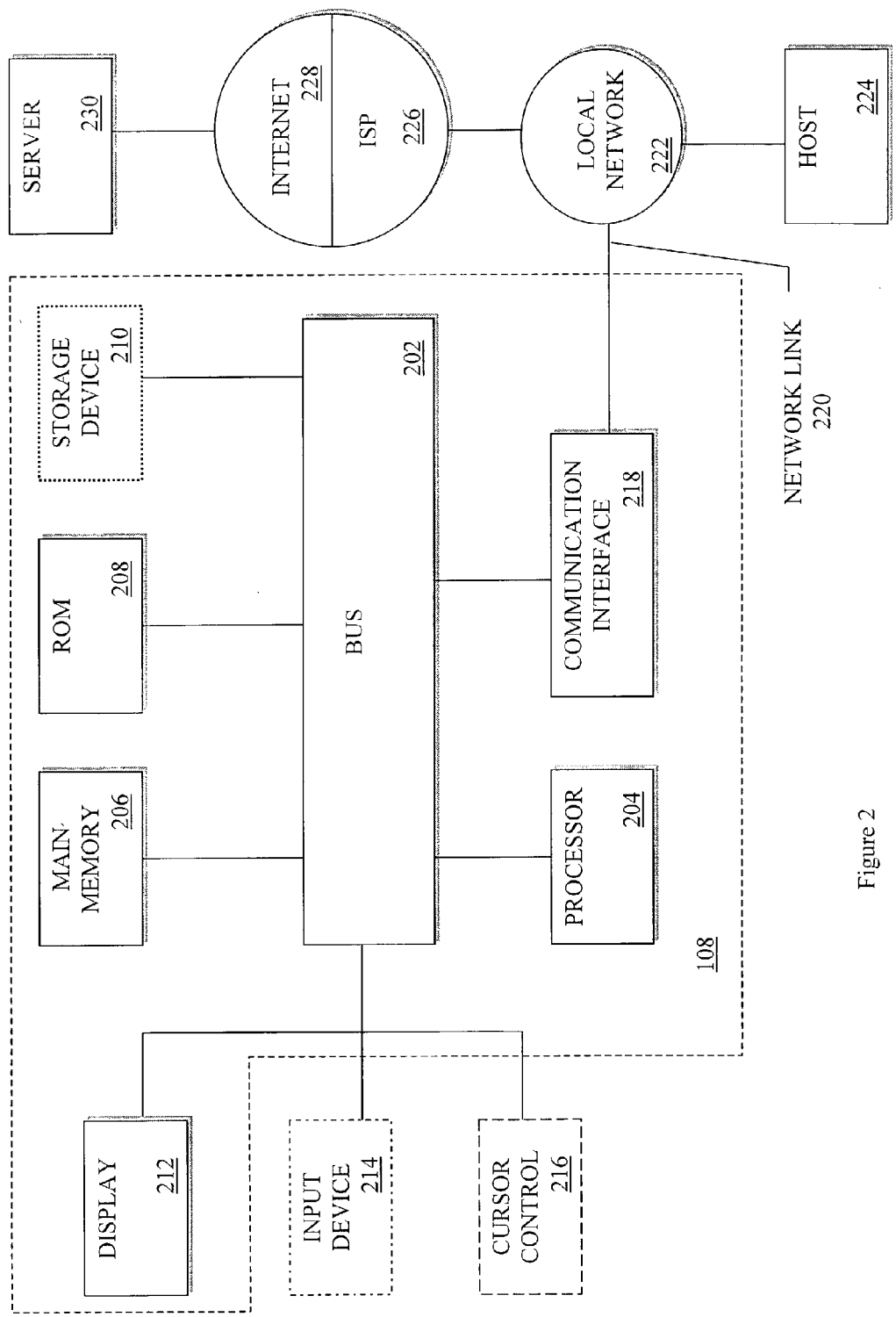
FIG. 2 is a high level block diagram of an exemplary device in conjunction with which an embodiment of the present invention may be used.

FIG. 2 is a block diagram depicting an exemplary computer or user device 108, e.g. a handheld device, in conjunction with which an embodiment of the present invention may be used. The present invention is usable with currently available handheld and embedded devices, and is also applicable to personal computers, mini-mainframes, servers and the like.

Device 108 includes a bus 202 or other communication mechanism for communicating information, and a processor 204 coupled with the bus 202 for processing information. Device 108 also includes a main memory 206, such as a random access memory (RAM) or other dynamic storage device, coupled to the bus 202 for storing a data structure for a compressed database according to an embodiment of the present invention and instructions to be executed by processor 204. Main memory 206 also may be used for storing temporary variables or other intermediate information during execution of instructions to be executed by processor 204. Device 108 further includes a read only memory (ROM) 208 or other static storage device coupled to the bus 202 for storing static information and instructions for the processor 204. A storage device 210 (dotted line), such as a compact flash, smart media, or other storage device, is optionally provided and coupled to the bus 202 for storing instructions.

Device 108 may be coupled via the bus 202 to a display 212, such as a flat panel touch-sensitive display, for displaying an interface to a user. In order to reduce space requirements for handheld devices, the display 212 typically includes the ability to receive input from an input device, such as a stylus, in the form of user manipulation of the input device on a sensing surface of the display 212. An optional input device 214 (dash dot line), such as a keyboard including alphanumeric and function keys, is optionally coupled to the bus 202 for communicating information and command selections to the processor 204. Another type of optional user input device is cursor control 216 (long dash line), such as a stylus, pen, mouse, a trackball, or cursor direction keys for communicating direction information and command selections to processor 204 and for controlling cursor movement on the display 212. This input device typically has two degrees of freedom in two axes, a first axis (e.g., x) and a second axis (e.g., y) allowing the device to specify positions in a plane.

The invention is related to the use of computer system 103, such as the depicted computer of FIG. 5, to identify and store changes to UDRS database 102 in a compressed data structure, i.e. delta file 103, for subsequent downloading to and updating of database 312 on device 108. According to one embodiment of the invention, data is updated from UDRS database 102 by device 108 in response to processor 204 executing sequences of instructions contained in main memory 206 in response to input received via input device 214, cursor control 216, or communication interface 218. Such instructions may be read into main memory 206 from another computer-readable medium, such as storage device 210. A user interacts with the database 312 via an application providing a user interface displayed (as described below) on display 212.

However, the computer-readable medium is not limited to devices such as storage device 210. For example, the computer-readable medium may include a floppy disk, a flexible disk, hard disk, magnetic tape, or any other magnetic medium, a compact disc-read only memory (CD-ROM), any other optical medium, punch cards, paper tape, any other physical medium with patterns of holes, a random access memory (RAM), a programmable read only memory (PROM), an erasable PROM (EPROM), a Flash-EPROM, any other memory chip or cartridge, a carrier wave embodied in an electrical, electromagnetic, infrared, or optical signal, or any other medium from which a computer can read. Execution of the sequences of instructions contained in the main memory 206 causes the processor 204 to perform the process steps described below. In alternative embodiments, hard-wired circuitry may be used in place of or in combination with computer software instructions to implement the invention. Thus, embodiments of the invention are not limited to any specific combination of hardware circuitry and software.

Device 108 also includes a communication interface 218 coupled to the bus 202 and providing two-way data communication as is known in the art. For example, communication interface 218 may be an integrated services digital network (ISDN) card, a digital subscriber line (DSL) card, or a modem to provide a data communication connection to a corresponding type of telephone line. As another example, communication interface 218 may be a local area network (LAN) card to provide a data communication connection to a compatible LAN. Wireless links may also be implemented. In any such implementation, communication interface 218 sends and receives electrical, electromagnetic or optical signals which carry digital data streams representing various types of information. Of particular note, the communications through interface 218 may permit transmission or receipt of instructions and data to be stored and accessed from the database, e.g. delta file 103 from UDRS database 102. For example, two or more devices 108 may be networked together in a conventional manner with each using the communication interface 218.

Network link 220 typically provides data communication through one or more networks to other data devices. For example, network link 220 may provide a connection through local network 222 to a host computer 224 or to data equipment operated by an Internet Service Provider (ISP) 226. ISP 226 in turn provides data communication services through the world wide packet data communication network now commonly referred to as the "Internet" 228. Local network 222 and Internet 228 both use electrical, electromagnetic or optical signals which carry digital data streams. The signals through the various networks and the signals on network link 220 and through communication interface 218, which carry the digital data to and from device 108, are exemplary forms of carrier waves transporting the information.

Device 108 can send messages and receive data, including program code, through the network(s), network link 220 and communication interface 218. In the Internet example, a server 230 might transmit a requested code for an application program through Internet 228, ISP 226, local network 222 and communication interface 218. In accordance with an embodiment of the present invention, device 108 interacts with the UDRS 104, e.g. on a server 230, to retrieve update information stored on the UDRS 104 via Internet 228, ISP 226, local network 222, and communication interface 218.

The received code may be executed by processor 204 as it is received, and/or stored in storage device 210, or other non-volatile storage for later execution. In this manner, device 108 may obtain application code and delta file 103 in the form of a carrier wave.

Figure 3:
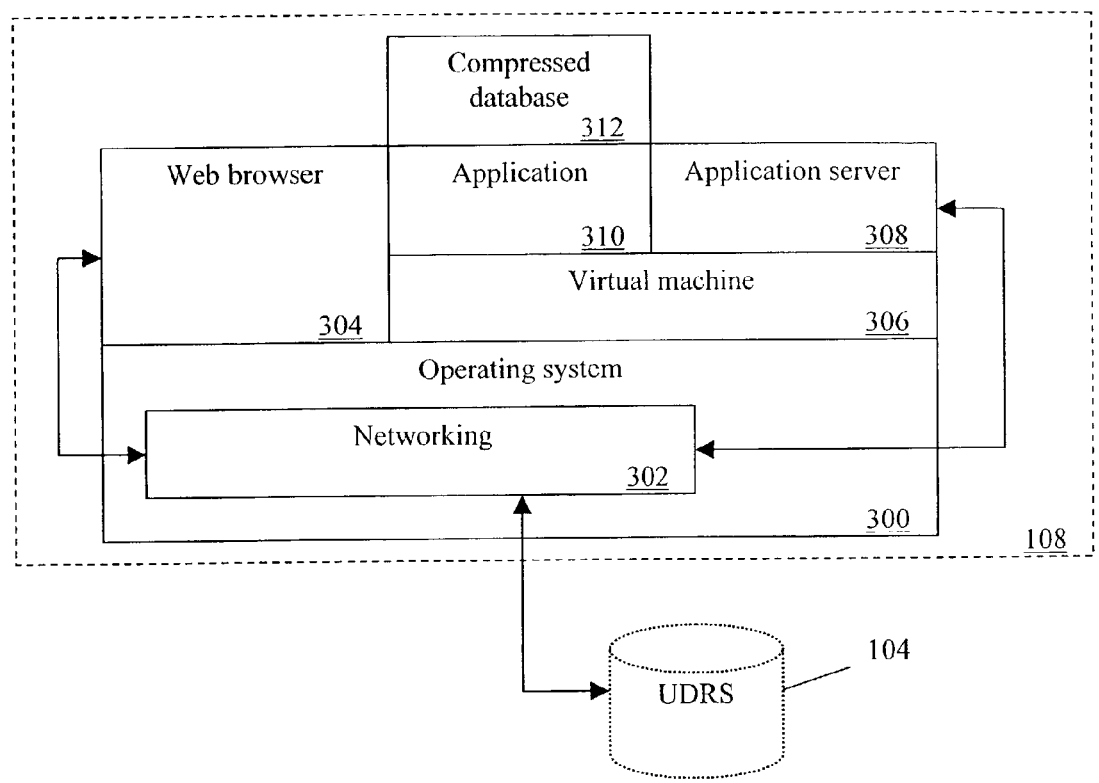
FIG. 3 is a high level block diagram of a portable software architecture usable with an embodiment of the present invention.

Referring now to FIG. 3, a high level block diagram depicts a portable software architecture as described in detail in co-pending application titled, "Portable Software Architecture," assigned to the present assignee, and hereby incorporated by reference in its entirety. A computer 108 includes an operating system 300, stored in ROM 208 and main memory 206, having a networking component 302. The processor 204 executes operating system 300 instructions from memory 206 and/or ROM 208. Instructions for a web browser 304, as is known in the art, are executed by the processor 204 and access functionality provided by the operating system 300 including functionality of networking component 302. Although web browser 304 is shown and described as a native software application, it is to be understood that in alternate embodiments web browser 304 can be a JAVA-based web browser executing on a JAVA virtual machine (JVM). Web browser 304 is a display and input interface for the user, i.e. the browser window is used to present information to the user and the same window is used to receive input from the user in the form of buttons, checkboxes, input fields, forms, etc.

Virtual machine 306 instructions are executed by processor 204 and cause the processor to access functionality provided by the operating system 300, e.g. function calls or method invocations. Virtual machine 306 executes a web application server 308 instructions to provide application serving functionality. In particular, web application server 308 executes an application 310 instructions in response to HTTP requests received by the web application server 308 from networking component 302. The application 310, interacting with the user provides the functionality requested by the user. For example, the application 310 may be a personal information management (PIM) software application managing contacts and related information for a user. The application 310 may be any software application desired by the user subject to memory and processing functionality.

Figure 4:
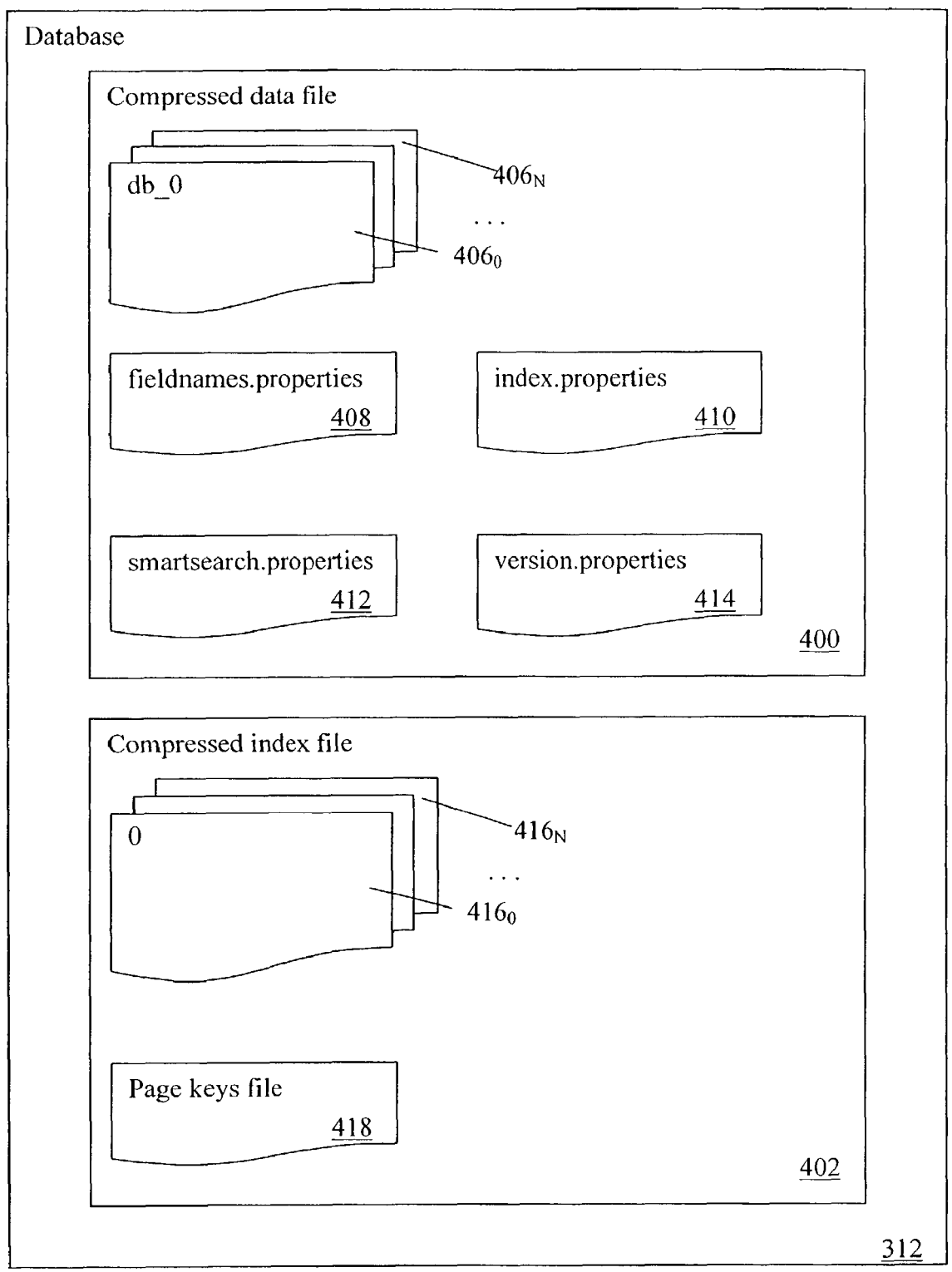
FIG. 4 is a high level block diagram of a compressed data structure for a database as used in an embodiment of the present invention.

Of note, FIG. 3 further includes a compressed database 312 according to an embodiment of the present invention for storing data accessed by the application 310. The compressed database 312 is utilized by the example software application of FIG. 3 and stored either in main memory 206 or storage device 210 of device 108. As depicted in FIG. 4 and described in detail in co-pending application entitled, "Compressed Data Structure for a Database," database 312 includes a compressed group of files collectively forming the database: a compressed data file 400 and a compressed index file 402.

A particular embodiment of the present invention employs the commonly used "zip"-type compression for compressing the files. The zip compression algorithms and file formats are known to persons of skill in the art. Zip compression software and libraries are available from multiple sources including PKWARE of Brown Deer, Wis. and Sun Microsystems, Inc. of Santa Clara, Calif. The type of compression used is not important as long as the needed functionality described below is supported, that is to say, it will be understood by persons of skill in the art that other compression formats are usable in conjunction with the present invention.

There may be more than one database 312 on each user device 108; however for clarity, only a single database will be described herein with reference to an embodiment of the present invention. Each database 312 contains the data file 400 and the index file 402 each in compressed form for a given database. Data file 400 is stored together with the corresponding index file 402 of the database 312 and in a particular embodiment data file 400 has a filename extension of ".ddb." Index file 402 is stored with data file 400 and includes the index name in the filename and in a particular embodiment index file 402 has a filename extension of ".idx.", Compressed data file 400, in turn, is made up of a collection of files $406_0$-$406_N$, also referred to as pages, and a plurality of configuration files, specifically a fieldnames properties file 408, an index properties file 410, a smartsearch properties file 412, and a version properties file 414.

Pages $406_0$-$406_N$ are ordered by the sequence number. Each page $406_0$-$406_N$ stores a portion of the database data and in a particular embodiment carriage returns delimit individual records or entries and tabs delimit individual fields. Using the key pages file 418 (described in detail below), a particular index page $416_0$-$416_N$ (also described in detail below) containing pointers to the compressed data pages $406_0$-$406_N$ is identified and decompressed. The decompressed index page $416_0$-$416_N$ is searched to identify the appropriate data page $406_0$-$406_N$ containing the searched for data. In this manner, only a portion of the entire database is decompressed for a given search.

The compressed database.ddb file includes both pages $406_0$-$406_N$ and a set of configuration files. The configuration files include: a fieldnames properties file 408, an index properties file 410, a smartsearch properties file 412, and a version properties file 414 which is used by an updater or any other process to determine the version of the current database and in a particular embodiment, contains a single numeric entry in the format YYYYMMDD indicating the date of the database 312.

In a manner similar to data file 400, the index file 402 is a compressed file including a set of index data files, referred to as index pages $416_0$-$416_N$, and a page keys file 418.

Within each index page $416_0$-$416_N$, the index data is stored as a repeating series of compressed pointer and index data and, in one embodiment, tabs are used to delimit each record. The index data of the index record is a copy of the indexed field in data file 400. Advantageously, because the index file 402 is compressed it is not necessary to attempt to minimize duplication as the compression of the index file handles the duplication elegantly. That is, processing time and capability and storage space need not be used to remove duplicate records from the compressed index file 402 because the compression of the index file 402 is used for this purpose without requiring additional functionality of the accessing or updating software application, e.g. application 310. For example, simply repeating the field value from the data page field in conjunction with a pointer is not an efficient storage structure; however, when used in conjunction with compression of the index file 402 much of the redundancy of the storage structure is removed.

Data within the index pages $416_0$-$416_N$ is ordered from first to last and each individual index page $416_0$-$416_N$ is identified by a zero based sequentially incrementing integer filename. Each record within an index page $416_0$-$416_N$ includes a pointer identifying the location of the corresponding record in the data file 400. In a particular embodiment, the pointer is an eight digit pointer value. The first three digits of the pointer value identify the data file page $406_0$-$406_N$ in which the corresponding record is located. The second five digits of the pointer value identify the offset from the start of the page $406_0$-$406_N$ in which the corresponding record is located.

Page keys file 418 is included in the compressed index file 402 in order to increase the speed of locating and loading a particular index into memory 206. Page keys file 418 specifies the number of keys (index results), the key name, the number of pages in the index file 402, and a list of the index value of the last entry on each index page.

Processor 204 (FIG. 2) reads page keys file 418 prior to creating the index and storing the index in memory 206. Using the page keys file 418, the processor is able to allocate the required memory without having to determine the index size by traversing the index. The created index data structure is then read by the processor 204 executing instructions of an index search routine to establish in which index page the candidate key is stored.

Processor 504 executing application 100 generates one or more delta, or change, files 103. Delta file 103 is a listing of changes, e.g. additions, modifications, and deletions, to the UDRS database 102. Processor 504 decompresses each data page $406_0$-$406_N$ and concatenates the data pages $406_0$-$406_N$ to create a new data page. The new data page is compared against a previous version of UDRS database 102 (not shown) and delta file 103 is generated. In one embodiment of the present invention, the comparison is performed in a line by line manner and the differences noted using the below-described format.

The format of an example generated delta file 103 is depicted in Table 1 below.

TABLE 1

| Action identifier | Entry identifier | Entry value | Entry terminator |
|---|---|---|---|
| "a" | 20 | "XX YY ZZ" | "." |
| "c" | 25 | "ZZ YY XX" | "." |
| "d" | 30 31 32 33 34 35 | | "." |

The first row of entries, i.e. the header row, depicted in Table 1 is for reading clarity and is not required for practicing the present invention. If a line has been added to UDRS database 102 as compared to the previous version, then a line is added to delta file 103. The columns of Table 1 specify the contents of delta file 103. Each entry in delta file 103 includes an action identifier (column 1) for identifying the difference between the two compared version of UDRS database 102, an entry identifier (column 2) for identifying the entry to which the action identifier applies, and an entry terminator (column 4) for identifying the end of the entry. The entry identifier (column 2) can include multiple, space-separated entries to specify that the action specified (by column 1) is to be applied to multiple entries. The add and change entries (rows 2 and 3) each include an entry value (column 3) for specifying the value to be added and changed, respectively. The delete entry (rows 4) does not include an entry value because the entire entry is deleted, i.e. there is no related value.

As depicted in row two of Table 1, the added line begins with an action identifier, e.g. a letter "a", followed by an entry identifier, e.g. line number "20", of the entry added with respect to the UDRS database 102, the entry value of the added entry, e.g. "XX YY ZZ", and an entry terminator, e.g. a period. Therefore, row two specifies that line 20 has been added to UDRS database 102 in comparison with the previous version.

As depicted in row three of Table 1, the changed or updated line begins with an action identifier, e.g. a letter "c", followed by an entry identifier, e.g. line number "25", of the entry changed with respect to UDRS database 102, the entry value of the changed entry, e.g. "ZZ YY XX", and an entry terminator, e.g. a period. Therefore, row three specifies that line 25 has been changed to "ZZ YY XX" in UDRS database 102 in comparison with the previous version.

As depicted in row four of Table 1, the deleted line begins with an action identifier, e.g. a letter "d", followed by an entry identifier, e.g. line numbers 30 through 35 specified as "30 31 32 33 34 35", and an entry terminator, e.g. a period. Therefore, row four specifies that lines 30 through 35 have been deleted from UDRS database 102 in comparison with the previous version.

After delta file 103 is generated, processor 504 executes sequences of instructions causing processor 504 to compress delta file 103. Delta file 103 is then stored in either main memory 506 or storage device 510. Processor 504, responsive to receiving a request for delta file 103 from device 108 via communication interface 518, transmits compressed delta file 103 to device 108. Upon receiving delta file 103, device 108 performs an update process as described in co-pending application titled, "Method of Updating a Compressed Data Structure." A brief description of the update process is provided below.

Periodically or on user request the data in database 312 is synchronized with the data in UDRS database 102. A delta file, or change file, is created using the process described above. Delta file 103 is generated based on changes to data in UDRS database 102.

After user device 108 connects to UDRS 104, a processor executing UDRS 104 instructions compares the version of database 312 on device 108 to the version of UDRS database 102. There are three possible comparison outcomes: (1) database 312 version is the same as UDRS database 102 version, (2) database 312 version is newer than the UDRS database 102 version, and (3) database 312 version is older than the UDRS database 102 version. If the database 312 does not exist on device 108, then the UDRS database 102 is transferred from UDRS 104 to device 108.

If the database 312 version is newer than the UDRS database 102, then there is data in database 312 which needs to be provided to UDRS 104 for updating UDRS database 102. Updated data from database 312 is transferred from device 108 to UDRS 104 for updating UDRS database 102. If the database 312 version is the same as the UDRS database 102, then there no update of database 312 is necessary and no data transfer occurs between device 108 and UDRS 104.

If the database 312 version is older than the UDRS database 102, then delta file 103 is downloaded to device 108 and database 312 is updated as described below.

After downloading delta file 103 to device 108, processor 204 generates a database 312 identical to the current UDRS database 102 using the contents of delta file 103. Delta file 103 specifies whether a line is to be added, updated, or deleted from database 312. In a particular embodiment, a new database 312a (not shown) is created as a result of comparison between delta file 103 and database 312 and new database 312a replaces the old database 312 on device 108 thereby minimizing data loss due to errors. A process for updating data stored in a compressed data structure is executed by processor 204 as described in detail in co-pending application "Method of Updating a Compressed Data Structure."

After completing the update process described above, new database 312a is used in place of old database 312 and indices $416_0$-$416_N$ for the new database 312a are generated using the process described in detail in co-pending application entitled, "Compressed Data Structure for a Database."

It will be readily seen by one of ordinary skill in the art that the present invention fulfills all of the objects set forth above. After reading the foregoing specification, one of ordinary skill will be able to affect various changes, substitutions of equivalents and various other aspects of the invention as broadly disclosed herein. It is therefore intended that the protection granted hereon be limited only by the definition contained in the appended claims and equivalents thereof.

What is claimed is:

1. A method of identifying and storing data changes of a first compressed database compared with a previous compressed database in order to update a second compressed database on a particular user device based on the stored data changes, wherein the data in the first and second compressed databases is stored in compressed form in uniquely identified data pages, the method comprising:
    running a service at a server computer to obtain information from data sources for updating the previous compressed database to produce the first compressed database, wherein the server computer is configured to communicate over a network with plural user devices including the particular user device for updating databases in respective plural user devices;
    decompressing, by the server computer, plural uniquely identified data pages of the first compressed database and combining the plural decompressed data pages to form a first new data page, and decompressing at least one uniquely identified data page of the previous compressed database to form a second new data page;
    reading, by the server computer, an entry from the first new data page and reading an entry from the second new data page;
    comparing, by the server computer, the read entries;
    identifying, by the server computer, a type of action performed on the entry of the second new data page based on the read entry comparison for differing read entries;
    storing, by the server computer, a delta entry in a delta file based on the read entry comparison for differing read entries;
    adding, by the server computer, an indication of the type of action to the delta entry, wherein the type of action is from the group of an entry addition action, an entry change action, and an entry deletion action;
    compressing, by the server computer, the delta file for use in updating the second compressed database;
    transmitting the compressed delta file over the network to the particular user device for updating the second compressed database at the particular user device; and
    repeating, by the server computer, the decompressing, reading, comparing, identifying, and storing for all entries in the first new data page and the second new data page.

2. The method of claim 1, wherein transmitting the compressed delta file is in response to receiving a request for the delta file from the particular user device.

3. The method of claim 1, wherein the entry of each of the first and second new data pages is a line.

4. The method of claim 1, wherein the delta entry includes an entry identifier and an action type identifier to identify the type of action.

5. The method of claim 4, wherein the delta entry further includes a delta entry value.

6. The method of claim 1, further comprising:
    decompressing another uniquely identified data page of the previous compressed database; and
    combining the decompressed uniquely identified data pages of the previous compressed database to form the second new data page prior to reading an entry.

7. The method of claim 1, wherein transmitting the compressed delta file to the particular user device comprises transmitting the compressed delta file to a handheld device.

8. A non-transitory computer-readable storage medium comprising:
    a data structure for a first compressed database comprising one or more uniquely identified data pages;
    a data structure for a previous version of the first compressed database comprising one or more uniquely identified data pages;
    at least one sequence of machine executable instructions in machine form, wherein execution of the instructions by a processor cause a server computer to:
        run a service at the server computer to obtain information from data sources to update the previous version of the first compressed database to produce the first compressed database, wherein the server computer is configured to communicate over a network with plural user devices for updating databases in respective plural user devices;
        decompress plural uniquely identified data pages of the first compressed database and combine the plural decompressed data pages to form a first new data page, and decompress at least one uniquely identified data page of the previous version of the first compressed database to form a second new data page;
        compare an entry of the first new data page and an entry of the second new data page;
        identify an action type performed on the entry of the second new data page based on the entry comparison for differing entries of the first new data page and the second new data page;
        store a delta entry in a delta file based on the entry comparison for differing entries;
        add an indication of the action type to the delta entry, wherein the action type is from the group of an entry addition action, an entry change action, and an entry deletion action;
        compress the delta file for use in updating a second compressed database at a particular one of the user devices;
        transmit the compressed delta file over the network to the particular user device for updating the second compressed database at the particular user device; and
        repeat the decompressing, comparing, identifying, and storing for all entries in the first new data page and the second new data page.

9. The medium of claim 8,
    wherein transmitting the compressed delta file is in response to receiving a request for the delta file from the particular user device.

10. The medium of claim 8, wherein the delta entry includes an entry identifier and an action type identifier to identify the action type.

11. The medium of claim 10, wherein the delta entry further includes a delta entry value.

12. The medium of claim 8, wherein the entry of each of the first and second new data pages is a line.

13. The medium of claim 8, further comprising instructions which, when executed by the processor, cause the server computer to:

decompress another uniquely identified data page of the previous version of the first compressed database; and combine the decompressed uniquely identified data pages of the previous version of the first compressed database to form the second new data page.

14. A method comprising identifying and storing data changes of a first compressed database with a previous version of the first compressed database for updating a second compressed database based on the stored data changes, wherein the data in the first compressed database is stored in compressed form in uniquely identified data pages and the data in the previous version of the first compressed database is stored in compressed form in one or more uniquely identified data pages on a server computer, wherein the identifying and storing comprising:

running a service at the server computer to obtain information from data sources for updating the previous version of the first compressed database to produce the first compressed database, wherein the server computer is configured to communicate over a network with plural user devices for updating databases in respective plural user devices;

decompressing, by the server computer, plural uniquely identified data pages of the first compressed database and combining the plural decompressed data pages to form a first new data page, and decompressing at least one uniquely identified data page of the previous version of the first compressed database to form a second new data page;

storing, by the server computer, delta data indicative of a difference identified by comparing data in the first new data page with data in the second new data page in a delta file based on the data comparison for differing data;

identifying, by the server computer, a type of action performed on the entry of the second new data page based on the comparing;

adding, by the server computer, an indication of the type of action to an entry of the delta file, wherein the type of action is from the group of an entry addition action, an entry change action, and an entry deletion action;

compressing, by the server computer, the delta file for use in updating the second compressed database at a particular one of the plural user devices, transmitting the compressed delta file over the network to the particular user device for updating the second compressed database at the particular user device; and repeating, by the server computer, the decompressing and storing for all entries in the first new data page and the second new data page.

15. The method of claim 14, further comprising:

decompressing another uniquely identified data page of the previous version of the first compressed database; and combine the decompressed uniquely identified data pages of the previous version of the first compressed database to form the second new data page.

* * * * *